United States Patent
Hendrie

(10) Patent No.: US 7,243,615 B1
(45) Date of Patent: Jul. 17, 2007

(54) DUAL-CONTROL DOG COLLAR

(76) Inventor: John V. Hendrie, 910 N. Fifth St., Perkasie, PA (US) 18944

( * ) Notice: Subject to any disclaimer, the term of this patent is extended or adjusted under 35 U.S.C. 154(b) by 0 days.

(21) Appl. No.: 11/381,204

(22) Filed: May 2, 2006

(51) Int. Cl.
*A01K 27/00* (2006.01)

(52) U.S. Cl. ...................................... 119/792; 119/863

(58) Field of Classification Search ................ 119/792, 119/863, 864, 856; 54/193; D30/152, 153; 24/163 R
See application file for complete search history.

(56) References Cited

U.S. PATENT DOCUMENTS

| | | | | |
|---|---|---|---|---|
| 5,503,113 A | * | 4/1996 | Knight | 119/856 |
| 5,701,849 A | * | 12/1997 | Suchowski et al. | 119/865 |
| 5,791,295 A | * | 8/1998 | Schmid et al. | 119/793 |
| 6,016,772 A | * | 1/2000 | Noyes | 119/863 |
| 6,401,666 B1 | * | 6/2002 | Kircher | 119/792 |
| 6,564,754 B1 | * | 5/2003 | Cohen | 119/856 |

\* cited by examiner

*Primary Examiner*—Yvonne R. Abbott

(57) ABSTRACT

An adjustable dog collar having two attachment points permits the collar diameter to be regulated from a distance. The collar is constructed of a single piece of belting which is looped over an upper center bar of a three-bar cinch. The belting then passes under one of the cinch side bars, encircles the dog's neck, and terminates at the other side bar. The attachment points are located at a control ring located on the end of the belting loop and at another fixed location along the collar. Force is applied to these attachment points by connected leashes which either loosen, tighten, or hold constant the dimension of the collar depending upon the relative amount of force applied to each leash.

7 Claims, 2 Drawing Sheets

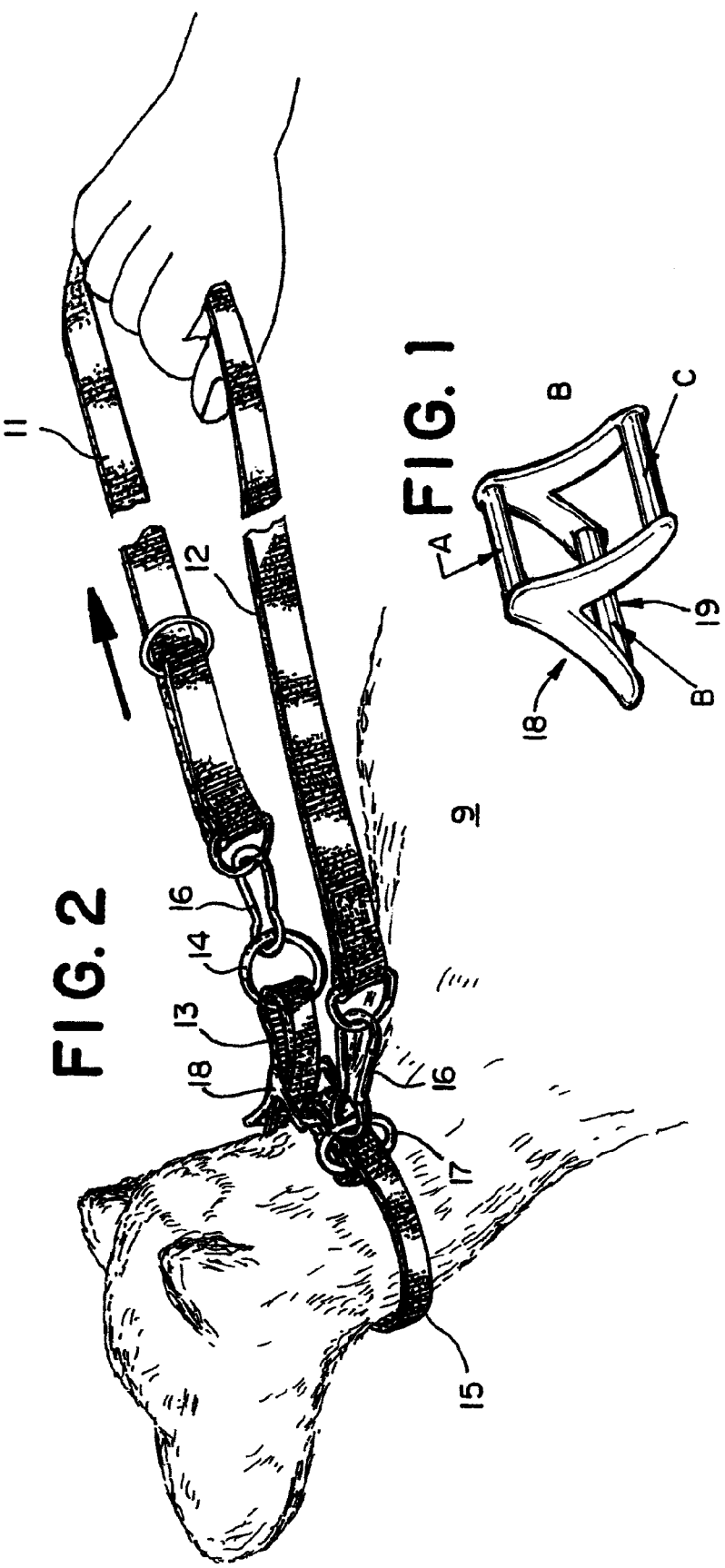

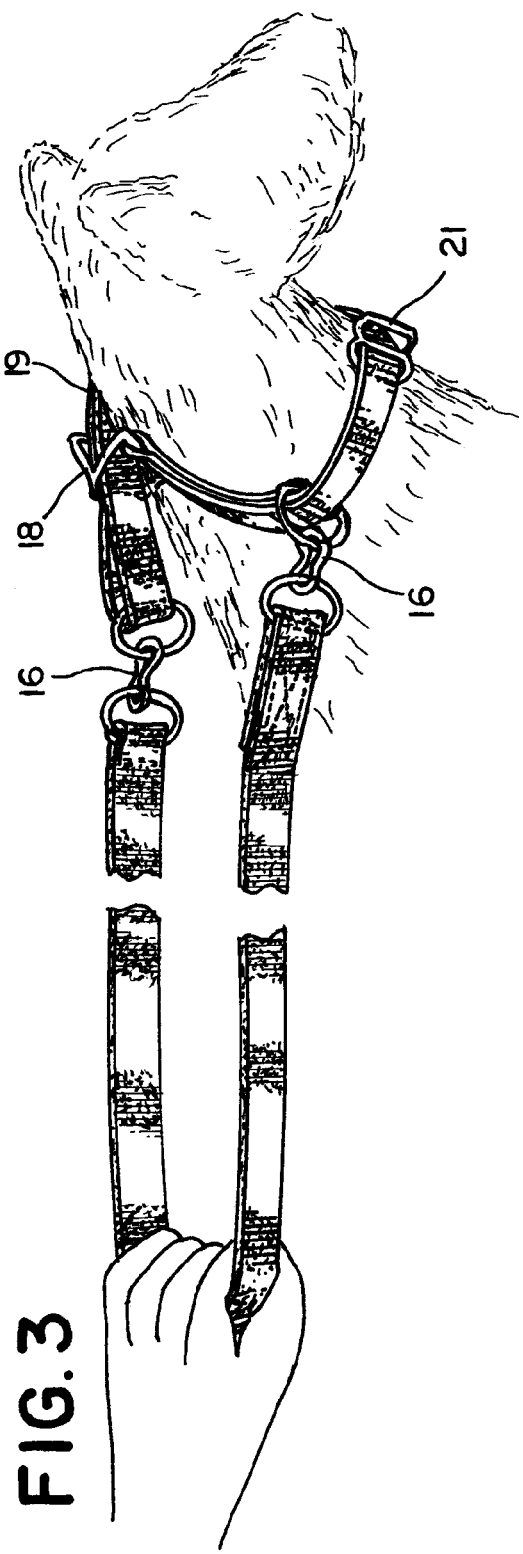
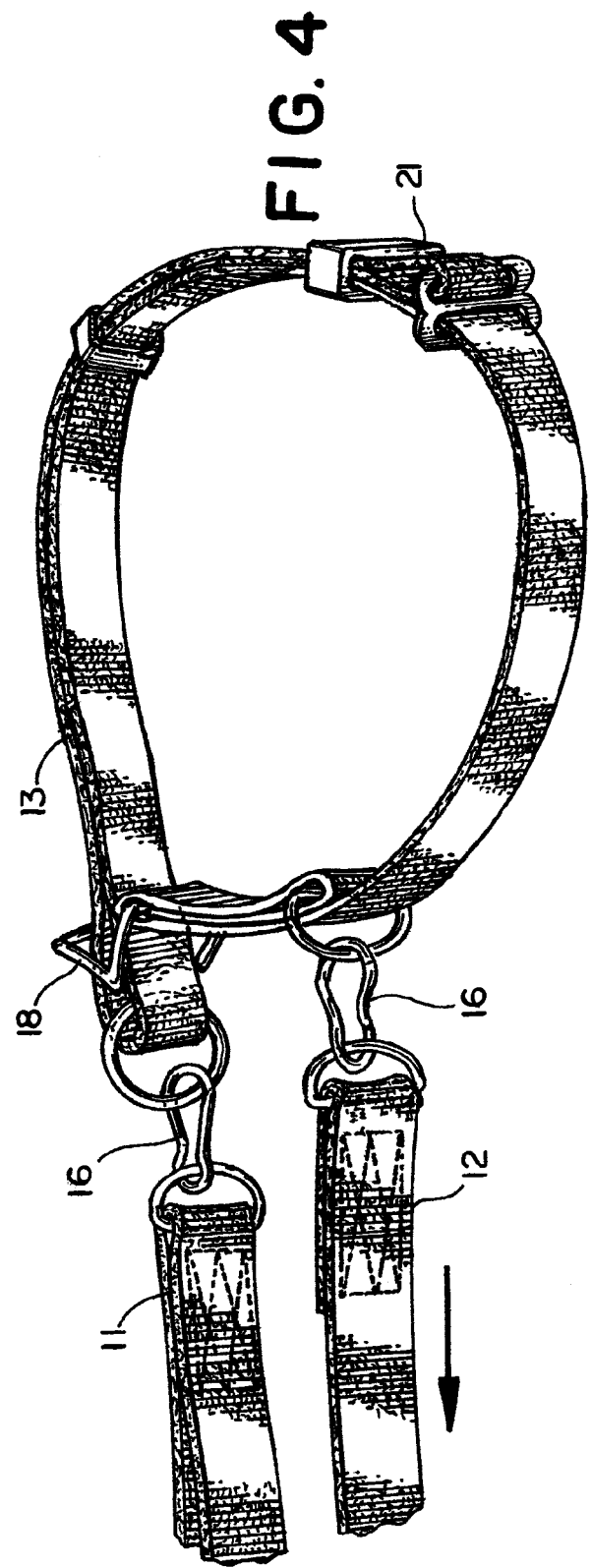

DUAL-CONTROL DOG COLLAR

FIELD OF THE INVENTION

The present invention relates to physical restraints for animals which are worn on the body of the animal. More specifically, it relates to a leashed collar for a dog which provides remote adjustability.

BACKGROUND OF THE INVENTION

In the critical field of homeland security the use of highly trained dogs has become a powerful tool for military and police. The training and control of these animals has proven to be a serious factor in the ability of the handler to perform his duty. In situations where immediate authority must be displayed, the dog has become a highly effective companion and is respected for his many natural abilities.

Presently there are numerous dog training farms where these animals are raised and trained to perform their many functions with precision and faithful dedication. Where the essential performance of the dog is being perfected, the all important equipment for control and training is antiquated and can, in some cases, be harmful to the dog. Whether in training or in the field, the safety and protection of the dogs must have the same priority as the officer. In all phases of the military, police and security departments, the equipment being used to perform their jobs is uniform and is the same in training as it is in the field of use. For example, there is a need in the art for a training collar for a dog which can be quickly controlled by the handler remotely without getting close to or touching the dog. This is particularly important when the dog is agitated or in attack mode. One element of control is provided by the size or diameter of the collar which encircles the dog's neck. A tight collar which further tightens as greater leash force is applied, i.e. a choker chain collar, will exert the greatest amount of control over the dog however this may cause injury to the dog. It has become all too common, during the training of a young dog, to sustain unintentional injuries from the use of a choker chain collar. The least amount of control is supplied by a fixed diameter collar which is sized loosely around the dog's neck but this is not practical for training purposes. Collar dimensions between these two extremes provide a greater or lesser degree of control.

There is therefore need for a collar which can be easily adjusted in size quickly. There is a further need for a dog collar that can be variably size-adjusted at a distance from the dog. There is yet further need for a training collar for a dog which provides a desired degree of control but which also protects the dog from injury. Thus far, no dog collar in the art is capable of providing this functionality.

SUMMARY OF THE INVENTION

The outstanding advantage of this invention is the safe control of a dog while pain free training is in progress. This dual-control collar allows the handler to give a safe physical command to the dog through an effective tightness of the collar by a one hand control of a convertible animal control leash such as shown in U.S. Pat. No. 6,340,001. This leash and collar combination allows the handler to transmit a message to the dog along with a verbal command. The handler has control of the reduction of the size of the collar regardless of the force being applied by the dog. This action gives the handler the ability to reduce or increase the collar size depending on the response of the dog. With all other choker type control collars the more force the dog applies to the collar the more the collar restricts and the more pain the dog feels. The dog adjusts to the discomfort of the choker chain rather than the training effort by the handler. With the dual-control collar the atmosphere of control is exhibited by the handler and the dog can connect the physical action with the verbal command. Training and control are accomplished by repeating the command and not by the infliction of pain. When the collar is not being used in the control mode the collar will function in a conventional way, with or without the leash.

A triangular three-bar cinch (sometimes hereinafter "tri-bar") 18 as shown in FIG. 1 is a key component of the present collar. The dual-control collar does not use buckles or any device with moving parts such as twin loop tungs or buttons. There are no holes in the collar belting. The collar is constructed of one piece of belting which is looped over the upper center bar A and then under either lower side bar B or side bar C of the tri-bar as shown in FIG. 3. As a force is applied to the belt the upper center bar loop exerts pressure on the lower side bar with a force that restricts the belting from moving. When a force is not applied to the belts, the collar can be adjusted or will return to a fixed collar size as shown in FIG. 3. This tri-bar adjustment makes a determined collar size that will remain constant regardless of force being applied by the dog because as force is increased on the collar an equal force is applied to the belts by the lower side bar. The functionality of the tri-bar slide will be further described with regard the figures of drawing as described in combination with the preferred embodiment which follows below. This functionality cannot be provided by any other type of prior art cinch or buckle.

More specifically, a dog collar has been devised which includes a series of interconnecting elements for use with a dual leash restraint comprising a primary belt having an elongate loop at one end which passes over an upper center bar of portions thereof pass under the lower side bar of the cinch. The second end of the belt is affixed to the other lower side bar of the cinch. A collar attachment ring is affixed to the belt adjacent the second end. A size-control ring encircles the end of the loop as it passes over the upper center control bar. The restraint includes two separate leashes, one end of a first leash being attached to the size-control ring and another end of the second leash being attached to the collar attachment ring. Preferably the separate leashes are parallel portions of a unitary strap having opposite ends snapped onto these collar attachment sites. With this combination of structures, applying a force to one leash tightens the collar and then applying a force to the second leash loosens the collar by changing its fixed circumferential length thus providing active control of the dog from a safe distance.

From the following drawings and description of the preferred embodiment, it will be appreciated by those of skill in the art that the objects of the invention have been achieved. While the present invention will be described with the reference to a specific embodiment, the following description is illustrative of the invention and is not to be construed as limiting the invention. Various modifications to the present invention can be made to the preferred embodiment by those skilled in the art without departing from the true spirit and scope of the invention. It will be noted here that for better understanding like components are designated by the reference numerals throughout the various figures of drawing which follow.

BRIEF DESCRIPTION OF THE DRAWINGS

FIG. 1 is a right front isometric view of the tri-bar cinch component of the invention.

FIG. 2 is a top right isometric view of the present invention.

FIG. 3 is a top left isometric view of the leash and collar combination of the invention.

FIG. 4 is a top left isometric view showing the collar at an intermediate position of adjustment.

DESCRIPTION OF THE PREFERRED EMBODIMENT

From the following figures of drawing, the invention will be understood as a series of interconnected belting, rings, and a tri-bar cinch all of which form a collar for encircling the dog's neck. Referring now to FIG. 2, the present invention is shown worn by a dog 9 with one leash 11 attached to a size control ring 14 that is fitted around an elongate loop portion 13 of collar belt 15. This loop 13 also passes over an upper center bar of a three-bar triangular cinch 18 and then under adjacent openings thereof. The other leash 12 is attached to a collar D-ring connector 17 that is immovably affixed to the collar belting adjacent a second end of the belt that is affixed to a lower side bar 19 of the cinch 18 as shown in FIG. 1. This dual-control leash is preferably a single length of material such as a strap folded to form parallel leashes with separate attachment means at the end of each leash and being grasped at the loop end.

In operation, the two leash attachment sites provide the collar with different degrees of dimension as a restraint force is applied to one leash 11, or the other leash 12, or both. With this configuration, by exerting a side hand motion to the leashes forces are created and transmitted to the collar ring and/or size-control ring so that the handler can adjust and control the degree of reduction of the collar size. A size-control ring 14 at the return end of the collar belt loop adjacent the upper center bar provides a leash connection that will pull both straps of the loop and provide a reduction in the collar size and a choker-type collar as shown in FIG. 2. As described above, when the other end of the same leash is connected to the fixed collar ring, a looped leash configuration is accomplished and in all cases single-handed control is provided. When the force on the leashes are equal as shown in FIG. 3, the collar will return to its previously adjusted size. When the handler exerts all of the force on the size-control ring leash as shown in FIG. 4, the reduction in size of the collar will be limited by the tri-bar upper center bar as it applies a force to the belts by the lower side bar. This action reduces injury to the dog. This dual connection creates an adjustable choker device that is completely controllable by the handler.

Referring specifically now to FIGS. 3 and 4, one-handed operation of the invention is depicted with the collar held in a fixed intermediate circumferential dimension midway between fully loosened and tightly constricted. In this embodiment, the ends of both leashes 11 and 12 are releasably attached to their respective rings on the collar by snap clasps 16. The collar belting also preferably includes adjustment means 21 which allows the maximum circumferential length of the collar to be adjusted to the size of the dog. As shown in FIG. 4, by pulling more on leash 12 while relaxing leash 11 the circumference of the collar is opened to its greatest dimension as the loop portion 13 slips back over the upper center bar of tri-bar cinch 18 until it reaches the end of the loop.

It should be understood that there may be other modifications and changes to the present invention that will be obvious to those of skill in the art from the foregoing description, however, the present invention should be limited only by the following claims and their legal equivalents.

What is claimed is:

1. A dog collar including a series of interconnecting elements including separate attachment means for two restraint leashes, comprising:
   a primary belt having an elongate loop at one end, said belt passing over an upper center bar of a three-bar triangular cinch and under adjacent openings thereof;
   a second end of said belt affixed to a side bar of said cinch;
   a collar connector immovably affixed to said belt adjacent said cinch side bar; and
   a size-control ring at said one end of said belt through which said loop passes whereby varying the relative leash forces between said two leashes at said connector and said ring changes the circumferential length of the collar.

2. The dog collar of claim 1 further including a leash having two separate leads, one end of a first lead being attached to a size control ring and a second end of a second lead of said leash being attached to said fixed collar ring.

3. The dog collar and leash combination of claim 2 wherein said separate leads are parallel runs of a unitary leash loop with opposite ends affixed to two different attachment points on said collar whereby grasping the leash at the loop return end and pulling on one lead tightens the collar and then pulling on the second lead loosens the collar.

4. The device of claim 3 wherein the ends of said leads are releasably attached to said dog collar.

5. The device of claim 4 further including safety snap clasps for releasably attaching the leads of said leash to said collar.

6. The device of claim 3 further including a collar strap maximum length adjustment means without a loose end.

7. The device of claim 1 wherein said cinch and said control ring are operative to maintain remotely adjusted collar length and to adjust collar size.

\* \* \* \* \*